May 8, 1973 E. L. STROH 3,732,125
FILLING DEVICE FOR USE WITH LIQUIDS
Filed Oct. 12, 1971 2 Sheets-Sheet 2

INVENTOR.
EMERSON L. STROH
BY
Woodard, Weikart, Emhardt & Naughton
ATTORNEYS

United States Patent Office 3,732,125
Patented May 8, 1973

3,732,125
FILLING DEVICE FOR USE WITH LIQUIDS
Emerson L. Stroh, 3356 N. Gladstone Ave.,
Indianapolis, Ind. 46218
Filed Oct. 12, 1971, Ser. No. 188,021
Int. Cl. H01m 7/00; G01f 23/00
U.S. Cl. 136—162            12 Claims

ABSTRACT OF THE DISCLOSURE

A device is disclosed which is suitable for use in adding distilled water to storage batteries. The device incorporates a siphon to add water to the battery and is designed such that water is added only if the electrolyte level is below a predetermined level.

BACKGROUND OF THE INVENTION

This invention relates to devices for adding liquids to containers.

Conventionally, liquid levels are maintained in containers, such as storage batteries, by opening the container, observing the liquid level, and pouring in through the opening additional liquid if needed. Sometimes devices are used which have a tube as a pour spout which can be inserted into a battery to the desired level of the liquid. Liquid then gurgles out of the device and air bubbles replace it until the liquid level within the battery reaches the lower level of the tube. When the open end of the tube is submerged in liquid, air can not enter the device and the filling operation automatically stops.

If such a device is left in a battery to continuously maintain electrolyte level, the electrolyte will eventually diffuse into the device thus causing a dilution of the electrolyte in the battery and deteriorating the performance of the battery. The alternative to leaving the filling device in the battery is to periodically fill each cell of each battery. This not only takes a considerable time, but it allows for the possibility that battery acid left on the tube of the filling device will cause injury to persons or damage to property.

Although it is simple to add a limited quantity of liquid to a partially filled container that is unvented to the atmosphere by introducing the liquid at a fixed pressure until a state of equilibrium is reached, such a method becomes extremely inefficient as the unfilled gaseous space becomes progressively reduced. Theoretically, it would be impossible to completely fill such a container by that principle; and, even by compromising, the method is impractical where quick results are desired.

Other methods for maintaining a certain liquid-level in a container usually have numerous and varied mechanical parts which are a potential source of malfunction resulting in inevitable maintenance or replacement expense. Furthermore, supplementary power facilities are often required for operation.

SUMMARY OF THE INVENTION

This invention relates to apparatus for adding liquids to containers which has a first means for applying pressure to the gas in the container and a second means for adding liquid to said container if and only if the gas in said container is reduced in volume by at least a predetermined amount upon application of pressure by said first means.

Embodiments of my invention may control the introduction of a liquid into a closed compartment by the combination of the liquid being introduced at a predetermined pressure into an accumulator capable of transferring said liquid into the compartment only if there is a definite insufficiency of liquid in said compartment; otherwise the accumulator returns said liquid to its source when the liquid pressure reverts to atmospheric. Such control requires that the proportion and design of interrelated components be coordinated. The mathematical relationship of those factors may be determined through the algebraic equations given elsewhere in this disclosure.

Some of the advantages of many embodiments of the invention are that numerous containers can be serviced simultaneously by one source of pressure and can be serviced by an unskilled person. Some embodiments have essentially no moving parts thus affording considerable reliability without maintenance. Some embodiments are very inexpensive to build and do not require an external source of power of any sort. The unique simplicity of this device affords economical production methods using certain plastics.

With this invention, the level of electrolyte normally maintained in a battery under normal use can be changed merely by changing the pressure applied. Temperature changes need not adversely affect the operation of embodiments of the invention, and the pressures involved typically will exert only minimal stress to the container seals and structure.

When used with a storage battery, some embodiments of the invention are especially appropriate because the cells of the battery are inherently vented subsequent to the addition of distilled water. This venting can eliminate the possibility of acid splatter and provide a vent for all of the cells which terminates at one convenient point. Some embodiments can be used with standard storage batteries without any modification to the battery whatsoever.

The fundamentals of my invention may be embodied in an assembly to an existing battery, or they may be embodied in a battery case at its time of manufacture.

DESCRIPTION OF THE PREFERRED EMBODIMENT

Figure 1:
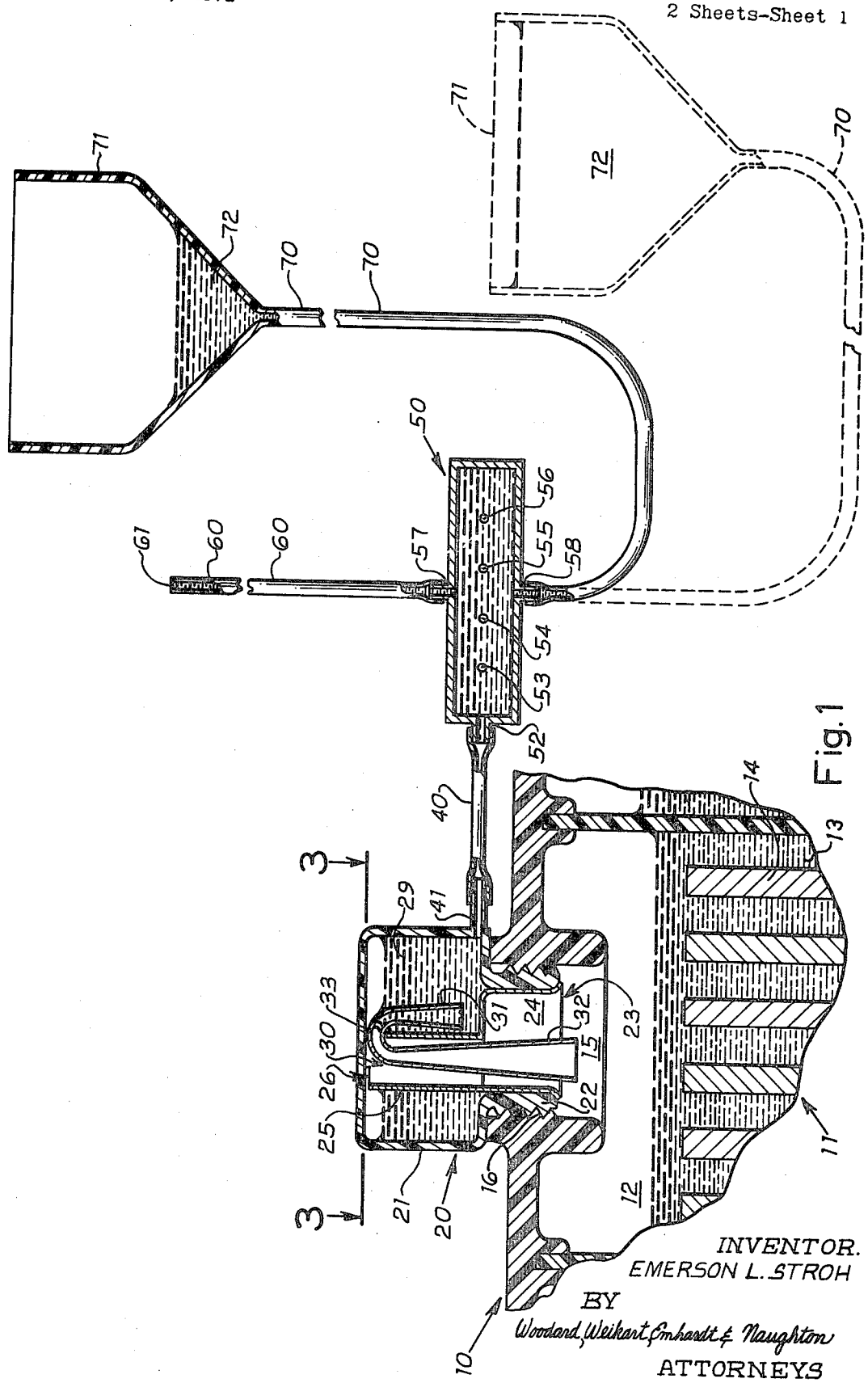
FIG. 1 illustrates a vertical section diametrically through apparatus which embodies my invention, and includes a portion of one cell in a typical electric storage battery.

Referring in particular to FIG. 1 there is illustrated a battery 10 which has a cell 11 which serves as a container for battery plates 14 and electrolyte 13. Above the electrolyte is a gaseous space 12 within the cell. The cell has a cell opening 15 which has a threaded portion 16.

Figure 3:
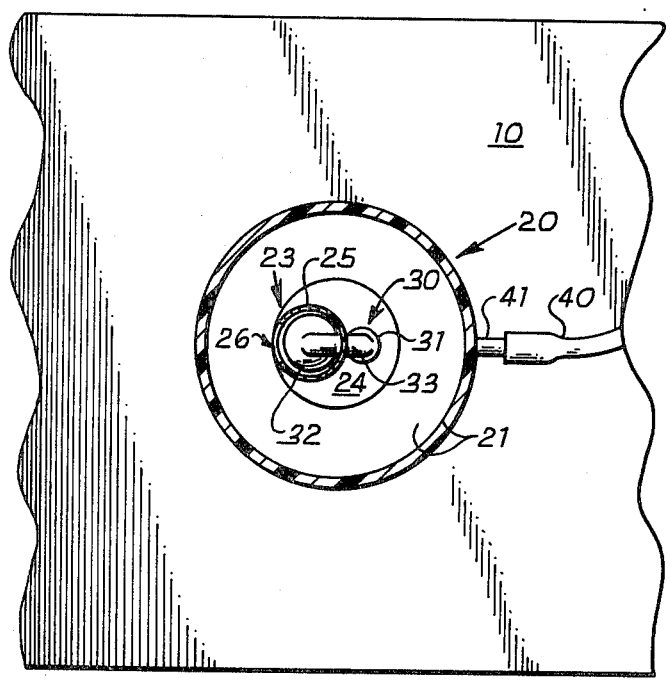
FIG. 3 illustrates a section of the accumulator portion of the apparatus of FIGS. 1 and 2 viewed from above the battery as indicated by line 3—3 of FIG. 1.

A liquid accumulator 20 has a plastic accumulator body 21 which has a threaded lower portion 22 for threading into the threaded portion 16 of the cell opening 15. Into the accumulator body 21 a hollow stopper 23 is inserted and seals around the lower edge of the acculator body. The lower portion 24 of the hollow stopper 23 is cylindrical in form as is the upper portion 25 of the hollow stopper. At the uppermost portion of the upper portion 25 of the hollow stopper is a vent 26. As is illustrated in FIGS. 1 and 3, vent 26 provides a passageway between the inside of the liquid accumulator and the inside of the cell by way of the hollow stopper 23.

A siphon 30 having a short leg 31 and a long leg 32 allows for discharge of water from the liquid accumulator 20 when the level of the water reaches the crown 33 of the siphon.

Siphon 30 is essentially an inverted U-tube having two descending legs of unequal length. The siphon is fixedly positioned with its crown 33 at the same level as the vent 26 and the short leg of the siphon terminates within said liquid accumulator in proximity to the latter's bottom wall, while the long leg of the siphon terminates at an appreciably lower level within the gaseous space 12 of the cell 11 of the battery.

The longitudinal sectional configuration of the siphon is such as to minimize resistance to fluid flow and problems with capillary action. Accordingly it is progressively enlarged from its crown 33 to either open end. The enlarged open end of each leg is finished squarely at a ninety (90) degree angle to said leg's longitudinal axis; and both legs are fixedly positioned with their longitudinal axes vertical. The foregoing design contributes to an abrupt and clean cutoff of the action of the siphon, thus precluding entrainment of air-bubbles in the siphon tube.

The accumulator 20 has a nipple 41 to which a fluid tube 40 connects. This fluid tube 40 connects at its other end to a nipple 52 on a fluid manifold 50. The fluid manifold has other outlets 51 (not shown in FIG. 1), 53, 54, 55 and 56 for other fluid tubes for accumulators for other cells. At the lower portion of the fluid manifold 50 there is a nipple 58 to which is attached a fill and drain tube 70 which connects to a liquid reservoir 71 containing distilled water 72. At the upper portion of the fluid manifold 50 is a nipple 57 to which is attached a manifold vent tube 60 having an open end 61 which vents to the atmosphere.

Figure 2:
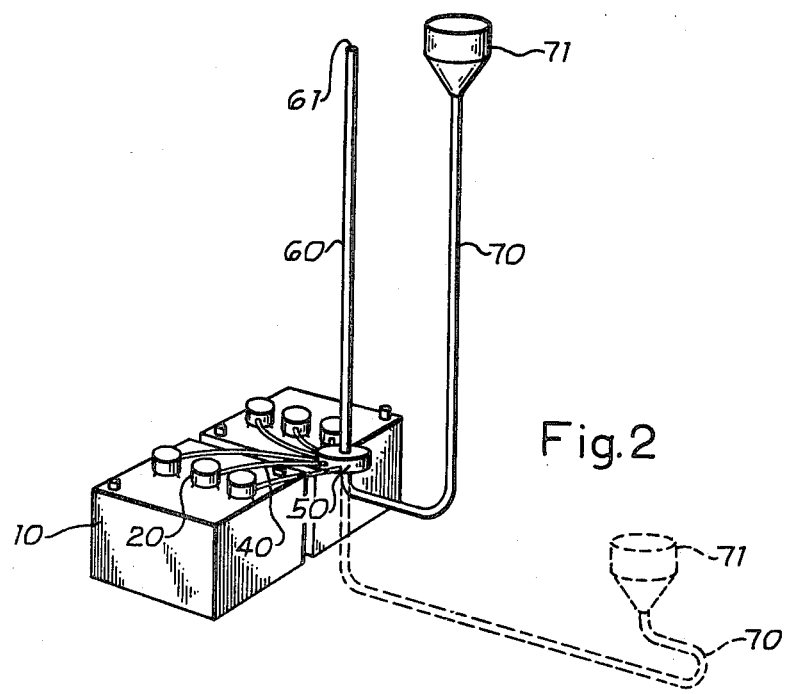
FIG. 2 is a perspective view of two storage batteries and associated apparatus which embody my invention and which incorporate the apparatus of FIG. 1.

FIGS. 1 and 2 illustrate both a solid line and a dotted line configuration of fill and drain tube 70, liquid reservoir 71 and distilled water 72. The solid line configuration is the configuration assumed upon the addition of water to the cell and the dotted line configuration is the position assumed either before or after the addition of water to the cells.

The following algebraic equations demonstrate the approximate pressure-volume relationship that relates to the disclosed embodiment of my invention. The equations with definitions of their terms are as follows:

$$P_c = \frac{P_i \times V_i}{V_c} \quad V_i = \frac{P_c \times V_c}{P_i} V_n + V_i - V_c \text{ or } V_i - \frac{P_i \times V_i}{P_c}$$

when, $P_i$=Initial Pressure—the initial absolute pressure of the atmosphere.

$P_c$=Compressing Pressure—the peak absolute pressure exerted on the gases within the liquid accumulator and battery cell by the water introduced.

$V_i$=Initial Volume—the volume of all gaseous spaces within the liquid accumulator, battery cell, and fluid tube 40 at the Initial Pressure.

$V_c$=Compressed Volume—the volume of all gaseous spaces in the liquid accumulator, battery cell, and fluid tube while subjected to the Compressing Pressure by the water introduced.

$V_n$=Net Volume—the volume of water which will pass from the fluid manifold 50 to the fluid tube 40, liquid accumulator, and battery cell upon the application of $P_c$.

The space outside of the hollow stopper 23 but inside of the accumulator body 21 in addition to the space inside of the fluid tube 40 defines an accumulator compartment 29. When this compartment is filled with water up to the crown 33 of the siphon 30, the siphon will begin to transfer water from the accumulator compartment to the cell 11. As this is happening the gases within the cell will pass through the vent 26 to the accumulator compartment. The siphoning action will continue until the water in the accumulator compartment is lowered to a level below the open end of the short leg 31 of the siphon 30. At this point siphoning will cease and a quantity of water will have been transferred to the cell 11. In the disclosed apparatus the accumulator compartment is equal in volume to 10 percent of the $V_i$ found in a cell having the desired electrolyte level.

In operation, the liquid reservoir 71 is elevated so that the distilled water 72 has a surface which is maintained at least 40 inches above the surface of the battery 10. The manifold vent tube 60 has an open end 61 which is 40 inches above the top of the battery to insure that the water pressure within the fluid manifold does not exceed a pressure of about 1.1 atmospheres. Prior to the raising of liquid reservoir 71 to its elevated position, the accumulator compartment 29, the fluid manifold 50, and the manifold vent tube 60 were all gas filled and provided a vent for the gases produced by the action of the battery 10. The battery cell and accumulator compartment, and the vent means and siphon which interconnects the accumulator compartment and the cell, are of a leakproof design so that fluids can be prevented from escaping or entering the apparatus other than through the fluid manifold 50. When the liquid reservoir is elevated the fluid manifold begins to fill with water and the water level will reach the openings 51 through 56, sealing within each cell and accumulator and fluid tube to which each opening connects, an initial volume of gases, $V_i$.

The pressure which will be applied to these gases will be determined by the height of the distilled water above the battery and will typically be 40 inches of hydraulic head or about 1.1 atmospheres. This pressure will force distilled water through the fluid tube 40 and into the accumulator 20. The amount of water which will flow through the fluid tubes to the accumulator will be a function of the amount of gases initially within the cell 11 and the pressure applied to the water. If the level of the electrolyte in the battery is high then the amount of gases in the cell will be small and the amount of water which will enter the accumulator compartment 29 will not be sufficient to initiate the siphoning action of siphon 30. If the level of the electrolyte in the battery is low then the volume of gas in the battery will be large and sufficient water will enter the accumulator compartment to initiate the action of the siphon 30.

It can be observed that with the system as described water will be added only to those cells which have an electrolyte level sufficiently low to cause an amount of water to enter the accumulator compartment and begin the siphon action. Those cells which have a sufficient electrolyte level will not receive any amount of water because the siphoning action will not be initiated. Typically the water is allowed to be subjected to a pressure of 1.1 atmospheres for at least a minute to insure that the water in the accumulator compartment has time to reach an equilibrium and to insure that if siphoning does begin that it will have sufficient time to empty the majority of the water in the accumulator compartment.

After the pressure has been applied to the water for at least a minute the liquid reservoir is lowered and the compressed gases within the battery cell 11 force any water remaining within the accumulator compartment out of the accumulator compartment and into the fluid manifold where it drains through the filling and drain tube 70 to the liquid reservoir 71 as shown in the dotted line portions of FIGS. 1 and 2.

It can be observed that this disclosed apparatus has the property of adding liquid to the battery cell if and only if the gases within the battery cell and accumulator and fluid tube are reduced in volume by at least a predetermined amount when subjected to pressure from the fluid manifold. In other words the apparatus senses the volume of gas above the electrolyte in the cell rather than sensing the level of the electrolyte directly.

While there have been described above the principles of this invention in connection with a specific apparatus, it is to be clearly understood that this description is made only by way of example and not as a limitation to the scope of the invention.

What is claimed is:

1. Apparatus using a filling device for adding liquids to a container and which comprises:
   (a) a container;
   (b) an accumulator compartment;
   (c) vent means providing a passageway between the interior of said container and the interior of said accumulator compartment;
   (d) siphon means having the uppermost portion of its siphon path below a portion of said vent means, said siphon means having a first end inside said accumulator compartment and a second end outside of said accumulator compartment and communicating with said container;
   (e) filling and drain means connected to said accumulator compartment for adding liquid to said accumulator compartment under pressure and for allowing the fluids in said accumulator compartment to drain out of said accumulator compartment without passing into said container; and
   (f) said container and accumulator compartment, and the vent means and siphon means which interconnect the container and accumulator compartment, being of a leakproof design so that fluids can be prevented from escaping or entering the apparatus other than through the filling and drain means.

2. The apparatus of claim 1 in which:
   said vent means couples between the top of the interior of said container and the top of the interior of said accumulator compartment, and
   said siphon means is an inverted U-tube having two descending legs of unequal length, the shorter leg being within said accumulator compartment and the longer leg having an open end outside of said accumulator compartment and communicating with said container.

3. The apparatus of claim 2 in which:
   each of said legs of said siphon are progressively enlarged from the crown of the siphon to the open end of the leg.

4. The apparatus of claim 3 in which each of said legs is positioned with its longitudinal axis vertical and has its open end finished squarely at a 90° angle to the vertical axis.

5. The apparatus of claim 4 in which said filling and drain means includes a fluid manifold connected to said accumulator compartment, a vent tube connected to the upper portion of said manifold and a drain tube connected to the lower portion of said manifold, said drain tube connecting to a supply reservoir.

6. The apparatus of claim 1 in which said filling and drain means includes a fluid manifold connected to said accumulator compartment, a vent tube connected to the upper portion of said manifold and a drain tube connected to the lower portion of said manifold, said drain tube connecting to a supply reservoir.

7. The apparatus of claim 1 in which said container includes a cell of a storage battery.

8. The apparatus of claim 7 in which said cell has a threaded opening and said accumulator compartment has a threaded portion which can be screwed into said threaded opening.

9. The apparatus of claim 5 in which said container includes a cell of a storage battery which cell has a threaded opening and said accumulator compartment has a threaded portion which can be screwed into said threaded opening.

10. Apparatus for attaching to a cell of a storage battery for introducing liquids to the cell and which comprises:
    (a) an accumulator compartment which has a threaded portion connected to it which is suitable for threading into the threaded opening of a cell of a storage battery to provide a fluid tight seal between the accumulator compartment and the cell;
    (b) vent means providing a passageway between the interior of said accumulator compartment and the center of said threaded portion on said accumulator compartment;
    (c) siphon means having the uppermost portion of its siphon path below a portion of said vent means, said siphon means having a first end inside said accumulator compartment and a second end outside said accumulator compartment;
    (d) filling and drain means connected to said accumulator compartment for adding liquid to said accumulator compartment under pressure and for allowing the fluids in said accumulator compartment to drain out of said accumulator compartment without passing through the center of said threaded portion of said accumulator compartment;
    (e) said filling and drain means including a fluid manifold connected to said accumulator compartment.

11. Apparatus for adding liquid to a container which comprises:
    (a) a container which contains a liquid and a gas,
    (b) first means for applying pressure to the gas in said container, and
    (c) second means for adding liquid to said container if and only if the gas in said container is reduced in volume by at least a predetermined amount upon application of pressure by said first means.

12. Apparatus of claim 11 in which said second means includes a siphon.

References Cited

UNITED STATES PATENTS

| 1,474,169 | 11/1923 | Sartakoff et al. | 136—162 |
| 1,878,223 | 9/1932 | Woodbridge | 136—162 |
| 2,899,481 | 8/1959 | Kardorff | 136—162 |

FOREIGN PATENTS

| 1,142,010 | 2/1969 | Great Britain | 136—162 |

DONALD L. WALTON, Primary Examiner

U.S. Cl. X.R.

116—118 R; 137—386, 453